United States Patent [19]

Gawell et al.

[11] Patent Number: 5,220,251

[45] Date of Patent: Jun. 15, 1993

[54] HORIZONTAL SCAN MODULATOR HAVING SIZE SELECTION

[75] Inventors: George R. Gawell, Mt. Prospect; Philip J. Nowaczyk, Chicago, both of Ill.

[73] Assignee: Zenith Electronics Corporation, Glenview, Ill.

[21] Appl. No.: 583,789

[22] Filed: Sep. 17, 1990

[51] Int. Cl.$^5$ ............................................. H01J 29/56
[52] U.S. Cl. .................................................. 315/371
[58] Field of Search ................................ 315/408, 371

[56] References Cited

U.S. PATENT DOCUMENTS 4,956,587 9/1990 Kitou et al. ........................ 315/408

Primary Examiner—Theodore M. Blum

[57] ABSTRACT

A display monitor includes a conventional cathode ray tube display together with conventional display drive circuitry. Vertical and horizontal deflection systems are operative to provide raster scanning of the cathode ray tube. High voltage apparatus produce the required CRT beam accelerating potential. A scan modulator is coupled to the horizontal deflection system and is operative to provide stable control of the amplitude of horizontal deflection signal. A modulator drive control responds to the amplitude of horizontal deflection signal and produces a control signal utilized by the modulator in maintaining stable horizontal scan amplitude. A scan selection network is coupled to the modulator drive control to selectively alter the operating point of the scan modulator and thereby produce different scan widths for normal and expanded view operation.

10 Claims, 2 Drawing Sheets

HORIZONTAL SCAN MODULATOR HAVING SIZE SELECTION

CROSS REFERENCE TO RELATED APPLICATIONS

This application is related to a copending application entitled Display Monitor Image Size Regulation, filed Nov. 30, 1990 and having a U.S. Ser. No. 07/620,504 which is assigned to the assignee of the present application and which is incorporated herein.

FIELD OF THE INVENTION

This invention relates generally to cathode ray tube display systems and particularly to those used in computing systems.

BACKGROUND OF THE INVENTION

Computing systems generally use one or more display monitors to provide a visual input/output capability. While the structure of computer display monitors varies, all generally include a cathode ray tube (CRT) having an evacuated envelope usually made of high-strength glass. The envelope defines a generally flat or slightly curved faceplate together with a funnel shaped bell and extending neck. The interior side of the faceplate supports a phosphor display screen. In monochrome displays, a single electron gun is supported within the CRT neck and is directed toward the phosphor screen. The electron gun produces a beam of electrons which are directed toward the faceplate striking the phosphor screen and causing visible light to be emitted therefrom. In color display systems, a plurality of electron guns are used together with a phosphor screen which supports plural areas of phosphors having differing color light emitting characteristics. A shadow mask or similar structure is interposed between the electron guns and the phosphor screen to cause each of the electron guns to stimulate an associated type of colored light emitting phosphor.

whether the display system is monochrome or color, the electrons emanating from the electron gun or guns form a CRT beam which is scanned in both the horizontal and vertical directions across the faceplate to form a raster. In most instances, the horizontal scan system is operative at a higher frequency than the vertical scan system. Thus, the horizontal scan moves the electron beam rapidly from side to side across the faceplate while the vertical scan system causes the successive horizontal scans to be moved progressively from top to bottom to complete a display frame and form the raster.

In the majority of the presently used display systems, electron beam scanning is accomplished by electromagnetic deflection of the CRT beam. A deflection yoke is supported upon the CRT envelope between the electron guns and the faceplate. The deflection yoke supports a plurality of deflection coils which are coupled to the horizontal and vertical scan systems. Horizontal and vertical scan signals provided by the respective scan systems are coupled to the windings of the deflection yoke to produce corresponding electromagnetic fields which bend the electron beam and thereby direct it to the desired portion of the CRT faceplate. Both the horizontal and vertical scan signals include longer duration sloped scan portions followed by shorter duration high amplitude retrace portions. The latter are utilized at the completion of each respective scan interval to return the electron beam to its starting position. In addition, the retrace portion of the horizontal scan signal is used to develop the high voltage necessary to accelerate the electron beam toward the CRT faceplate.

The character of the image displayed in a CRT display system results from variation or modulation of the intensity of the scanned CRT electron beam. This intensity modulation must be properly timed or synchronized to the horizontal and vertical rate scanning of the raster. Thus, as the electron beam is scanned across the faceplate to form a raster, the desired portions of the faceplate are illuminated by synchronized modulation of the electron beam to provide the desired image.

In most display monitors, a single image size format is presented and great care is taken to establish and maintain a precise relatively constant image size. However, it has been found desirable in certain applications to include the capability for expansion or enlargement of the displayed image to produce an enhanced more dramatic effect. In addition, such expansion or enlargement of the displayed image also renders the material easier to read and view. Image expansion is typically accomplished by deliberately inducing an "overscan" condition within the display monitor. Most monitors achieve overscan by simultaneous increase of the vertical deflection currents driving the deflection yoke. In effect, the raster is scanned beyond the border or outer edge of the CRT faceplate. Systems having overscan capability are subject, however, to additional problems not encountered by single display size monitors. For example, the precise adjustment and maintenance of the multiple size formats is often difficult to achieve. Frequently, the size changing mechanism introduces inaccuracies in the size control systems tending to degrade overall performance of the display monitor. In particular, the horizontal deflection system of display monitors often renders multiple size format operation more difficult due to the plurality of highly interactive tuned circuits within the deflection system and the interactive relationship between horizontal scan and high voltage generation.

There remains, therefore, a need in the art for an inexpensive, efficient image expanding display system operable upon the horizontal deflection systems of monitors which effectively provides for independent image size adjustment in each operating mode.

Accordingly, it is a general object of the present invention to provide an improved display monitor. It is a more particular object of the present invention to provide an improved display monitor having image expanding capability which substantially maintains image size stability in each mode of operation. It is a still more particular object of the present invention to provide a horizontal scan system for use in a display monitor which is operable in an image expanded mode and which is efficient and relatively inexpensive.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
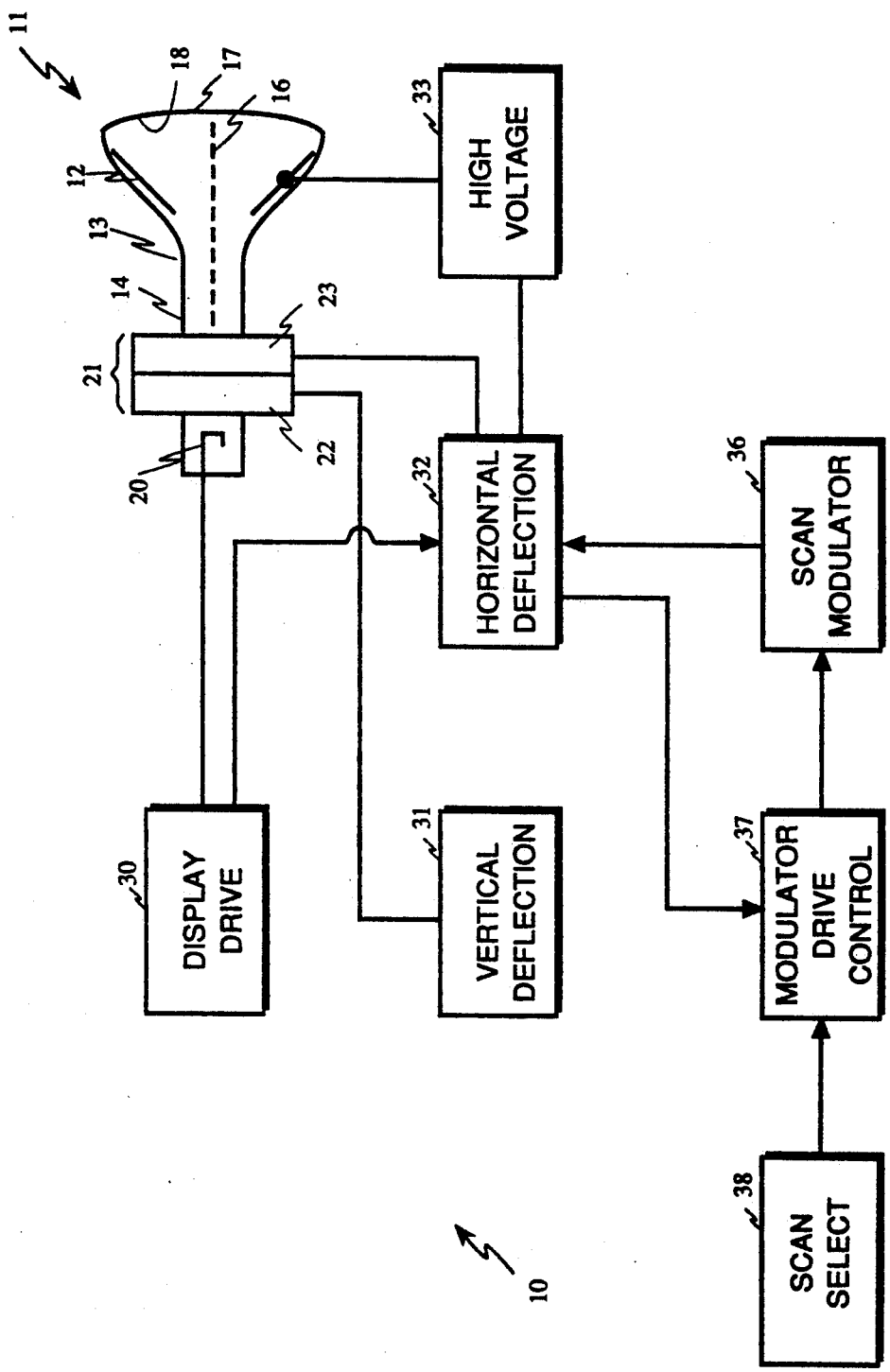
FIG. 1 sets forth a block diagram of a display monitor having a horizontal scan modulator constructed in accordance with the present invention.

FIG. 1 sets forth a block diagram of a display monitor constructed in accordance with the present invention and generally referenced by numeral 10. Display monitor 10 includes a conventional cathode ray tube 11 having an evacuated envelope 12 which includes a faceplate 17, a tapered funnel 13 and an elongated neck portion 14. In accordance with conventional fabrication techniques, an electron gun 20 is supported within neck 14 and is directed toward faceplate 17. A conventional high voltage electrode 15 is supported within envelope 12. A display drive 30 also constructed in accordance with conventional fabrication techniques includes circuitry for producing the video signals applied to electron gun 20 of CRT 11. A conventional yoke assembly 21 having a vertical deflection yoke 22 and a horizontal yoke 23 is supported upon envelope 12 and produces electromagnetic deflection fields within CRT 11. A vertical deflection system 31 is coupled to vertical yoke 22 and to display drive 30. A horizontal deflection system 32 is coupled to horizontal yoke 23 and to display drive 30. A high voltage system 33 is coupled to high voltage electrode 15 and horizontal deflection system 32. A scan modulator 36 constructed in accordance with the present invention and described below in greater detail is coupled to horizontal deflection system 32. A modulator drive control 37 also constructed in accordance with the present invention and described below in greater detail is coupled to scan modulator 36 and to a scan selector 38.

In operation, display drive 30, in accordance with conventional fabrication techniques, causes electron gun 20 to produce an intensity modulated stream of electrons formed into a CRT beam current 16. Electron beam 16 is directed toward faceplate 17 and phosphor screen 18 supported thereon. The electrons within CRT beam 16 are accelerated toward faceplate 17 by the high voltage present on electrode 15 and produce visible light as they strike phosphor screen 18. Horizontal deflection system 32 produces conventional horizontal scan signals which when applied to yoke 23 produce corresponding electromagnetic fields which in turn are operative upon CRT beam 16 causing side to side deflection thereof. As mentioned above, the horizontal scanning of CRT beam 16 causes it to be repeatedly scanned across faceplate 17 and retraced to its initial starting position. Vertical deflection system 31 produces vertical scan signals which are applied to vertical yoke 22 to produce corresponding electromagnetic fields within envelope 12 and deflect CRT beam 16 vertically between the top and bottom of faceplate 17. As is also described above, the vertical deflection of CRT beam 16 occurs more slowly than horizontal scan causing successive horizontal scans to progress downwardly with respect to faceplate 17 and to produce a scanned raster. Horizontal deflection 32 also produces a high amplitude short duration retrace pulse which is coupled to high voltage 33 and utilized to provide a high voltage accelerating potential at electrode 15. The purpose of the high voltage at electrode 15 is to provide the above-referenced acceleration of the electrons within CRT beam 16.

Thus, display drive 30, vertical deflection system 31, horizontal deflection system 32, high voltage system 33 and yoke 21 cooperate in accordance with conventional fabrication techniques to produce a scanned raster upon faceplate 17 of CRT 11. In further accordance with the process described above, display drive 30 also provides intensity modulation of CRT beam 16 to impart the desired image character to the image formed on faceplate 17. The proper display of the desired image is dependent, in part, upon the correct timing between the intensity modulations of CRT beam 16 and the vertical and horizontal scanning process. To facilitate this timing, synchronizing signals are produced by display drive 30 and applied to vertical deflection system 31 and horizontal deflection system 32.

In accordance with the operation set forth below in greater detail, scan modulator 36 is operative upon horizontal deflection system 32 to control the amplitude of horizontal deflection currents produced in horizontal deflection yoke 23. By means also set forth below in greater detail, modulation drive control 37 is coupled to horizontal deflection system 32 and receives and processes a portion of the horizontal deflection signal to produce a control signal which is coupled to scan modulator 36 to produce stable horizontal size of the displayed image. In accordance with an important aspect of the present invention, scan selection means 38 permits operator selection of a standard display size format or an expanded display size format both of which are accurately defined and precisely maintained.

Figure 2:
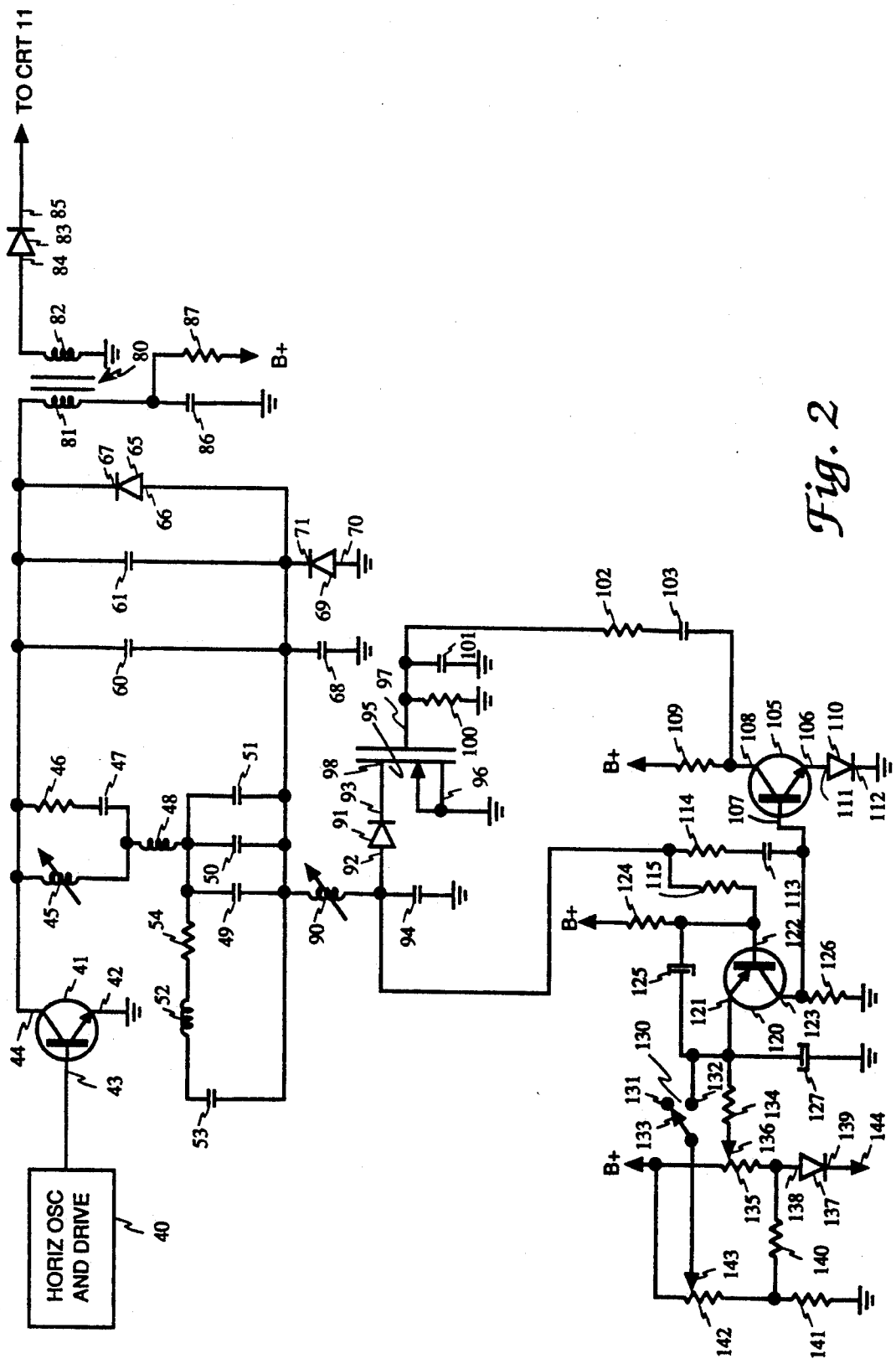
FIG. 2 sets forth a partial schematic, partial block diagram of the present invention horizontal scan modulator having size selection.

FIG. 2 sets forth a partial block, partial schematic diagram of horizontal deflection system 32, scan modulator 36, modulator drive control 37 and scan selection means 38. An NPN horizontal output transistor 41 has an emitter 42 coupled to ground, a base 43, and a collector 44. A horizontal oscillator and drive circuit 40 constructed in accordance with conventional fabrication techniques and producing conventional horizontal deflection drive signals is coupled to base 43 of horizontal output transistor 41. A linearity coil 45 having an adjustable inductance characteristic has one end coupled to collector 44 of transistor 41. A series combination of a resistor 46 and a capacitor 47 are coupled in parallel with linearity coil 45. A horizontal deflection yoke 48 has one end coupled to the junction of coil 45 and capacitor 47. The remaining end of horizontal yoke 48 is coupled to a parallel combination of S-shaping capacitors 49, 50 and 51. A series combination of a resistor 54, an inductor 52 and a capacitor 53 in parallel with capacitors 49, 50 and 51. A damper diode 65 has an anode 66 coupled to ground by a capacitor 68 and a cathode 67 coupled to collector 44 of horizontal output transistor 41. A diode 69 has an anode 70 coupled to ground and a cathode 71 coupled to anode 66 of diode 65. A pair of damper capacitors 60 and 61 are coupled in parallel with diode 65. A horizontal output transformer 80 has a primary winding 81 and a secondary winding 82. Primary winding 81 is coupled to collector 44 of horizontal output transistor 41 and to a source of operating supply voltage by a resistor 87. A capacitor 86 is coupled between the junction of resistor 87 and primary winding 81 and ground. A high voltage rectifier 83 has an anode 84 coupled to one end of secondary winding 82 of high voltage transformer 80 and a cathode 85 to CRT 11 as shown in FIG. 1. The remaining end of secondary winding 82 is coupled to ground.

A field effect transistor 95 has a source electrode 96 coupled to ground, a gate electrode 97 coupled to ground by a parallel combination of resistor 100 and capacitor 101 and a drain electrode 98. A diode 91 has an anode 92 and a cathode 93 coupled to drain electrode 98 of field effect transistor 95. A modulating inductance 90 is coupled between the common junction of capacitors 49 through 51 and to anode 92 of diode 91. Anode 92 is further coupled to ground by a capacitor 94.

An NPN transistor 105 has an emitter 106, a base 107 coupled to ground by a resistor 126, and a collector 108 coupled to a source of operating supply voltage by a resistor 109. Collector 108 is further coupled to gate electrode 97 of field effect transistor 95 by a series combination of a capacitor 103 and a resistor 102. A diode 110 has an anode 111 coupled to emitter 106 and a cathode 112 coupled to ground. A series combination of a capacitor 113 and a resistor 114 is coupled to anode 92 of diode 91. A PNP transistor 120 has an emitter 121, a base 122 coupled to a source of operating supply by a resistor 124 and a collector 123 coupled to ground by a resistor 126. Collector 123 is further coupled to base 107 of transistor 105. A resistor 115 couples base 122 of transistor 120 to anode 92 of diode 91. A capacitor 125 is coupled between base 122 and emitter 121 of transistor 120 while a capacitor 127 further couples emitter 121 to ground. A potentiometer 135 has one end coupled to a source of operating supply voltage and the remaining end coupled to a resistor 140. Resistor 140 is coupled to ground by a resistor 141. Potentiometer 135 further includes a movable contact 136 which is coupled to emitter 121 of transistor 120 by a resistor 134. A potentiometer 142 is coupled between a source of operating voltage and the junction of resistors 140 and 141. Potentiometer 142 includes a movable contact 143. A switch 130 includes a pair of stationary contacts 131 and 132 and a movable contact 133. Movable contact 133 is coupled to movable contact 143 of potentiometer 142. Contact 131 remains unconnected while contact 132 is coupled to emitter 121 of transistor 120. A diode 137 has an anode 138 coupled to the junction of potentiometer 135 and resistor 140 and a cathode 139 coupled to a connection terminal 144.

In operation, horizontal oscillator and drive circuit 40 produces conventional horizontal rate drive signals which, in essence, operate horizontal output transistor 41 as a horizontal deflection rate switch. Transistor 41 is, as a result, switched between conducting and nonconducting states at the horizontal deflection rate. The switching of transistor 41 produces deflection currents within linearity coil 45, horizontal deflection yoke 48 and modulating inductance 90. The character of deflection current within yoke 48 includes a longer duration generally saw wave scan current together with a high amplitude shorter duration retrace pulse. Linearity coil 45 is adjusted to provide a tuning component which improves the linearity of the scan portion of deflection current within yoke 48. Capacitors 49, 50 and 51 provide conventional S-shaping components for the deflection current within deflection yoke 48. Diodes 65 and 69 together with capacitors 60, 61 and 68 cooperate with modulating inductance 90 to stabilize the amplitude of deflection current within horizontal deflection yoke 48.

In addition to providing deflection current within yoke 48, the switching of horizontal output transistor 41 produces current flow through resistor 87 and primary winding 81 of high voltage transformer 80. Transformer 80 is generally tuned to maximize the energy transfer of the high amplitude horizontal retrace pulse produced by transistor 41 switching. In addition, the turns ratio between primary winding 81 and secondary winding 82 provides a voltage increase transformation of the horizontal retrace pulse. The resulting high amplitude retrace pulse is rectified by diode 83 and applied to CRT 11 to produce the above-described electron beam accelerating potential.

A portion of the horizontal deflection signal is coupled to transistors 105 and 120 by the combination of resistors 114 and 115 and capacitor 113. Signal is applied to transistor 105 in an AC coupling while the coupling to transistor 120 includes DC-coupling. Transistors 120 and 105 amplify the horizontal rate signal applied to bases 122 and 107 respectively. The amplified horizontal rate signal is coupled to gate electrode 97 of field effect transistor 95 by the series combination of resistor 102 and capacitor 103. In response to the applied horizontal rate signal, field effect transistor 95 controls the amount of deflection current carried by modulating inductance 90. Modulating inductance 90 together with diodes 65 and 69 and capacitors 60, 61 and 68 form a diode modulator operative upon the horizontal deflection system. As a result, the degree of conduction of deflection currents within modulating inductance 90 controls the amplitude of deflection currents within deflection yoke 48. Thus, the amount of deflection power within yoke 48 may be controlled by the controlling conduction of field effect transistor 95.

In accordance with an important aspect of the present invention, transistors 120 and 105 together with field effect transistor 95 cooperate with the above described diode modulator to maintain a substantially constant amplitude of horizontal deflection signal within yoke 48 for each bias or conduction level of transistor 120. For example, in the event the amplitude of deflection signal within deflection yoke 48 and modulating inductance 90 is increased, an increased signal is applied to base 107 of transistor 105. In addition, this increased signal also increases the conduction of transistor 120. The increased conduction of transistor 120 provides increased forward bias upon transistor 105 causing a greater amplitude of horizontal deflection signal to be applied to gate electrode 97 of field effect transistor 95. The increased drive to field effect transistor 95 in turn reduces the effective impedance presented by field effect transistor 95 in series with modulating inductance 90. The reduction of impedance in series with modulating inductance 90 reduces the current within deflection yoke 48 and the width of horizontal scan. Conversely, in the event deflection signal amplitude is decreased, a reduced signal is coupled to transistor 105 and a reduced biased is applied to transistor 105 by transistor 120. A corresponding decrease occurs in the drive signal applied to field effect transistor 95 as a result causing the effective impedance of field effect transistor 95 in series with modulating inductance 90 to be increased. The increased effective impedance in series with modulating inductance 90 in turn produces an increase of deflection current within deflection yoke 48. As a result, transistors 120 and 105 together with field effect transistor 95 and modulating inductance 90 cooperate to stabilize the amplitude of deflection current within deflection yoke 48.

Because the amplitude of deflection signal at which the system shown in FIG. 2 stabilizes is, for the most part, dependent upon the bias or conduction level of transistor 120, the stabilizing point of the system may be controlled by adjustment of the bias applied to transistor 120. Toward this end, potentiometer 135 and resistors 140, 141 and 134 cooperate to couple an adjustable DC voltage to emitter 121 of transistor 120. Thus, adjustment of potentiometer 135 produces a corresponding change in the biased condition of transistor 120 which in turn changes horizontal scan width. Potentiometer 135 becomes, in essence, a horizontal size control. In further accordance with the present invention, an additional potentiometer 142 is coupled to switch 130. In the position shown in FIG. 2, switch 130 is set in the open position and thus the bias of transistor 120 is unaffected by the setting of potentiometer 142. In the event switch 130 is closed by moving contact 133 into connection with contact 132, an additional source of bias voltage is provided by potentiometer 142 and applied to emitter 121 of transistor 120. With switch 130 closed, the bias condition of transistor 120 previously established by adjustment of potentiometer 135 may be altered by appropriate setting of potentiometer 142. Thus, in accordance with an important aspect of the present invention, switch 130 may be initially placed in the open position shown in FIG. 2 during which time potentiometer 135 is adjusted to provide the desired horizontal scan width during normal operating conditions. Thereafter, switch 130 may be closed placing potentiometer 142 within the biasing circuit of transistor 120 and potentiometer 142 may be adjusted to provide an increased horizontal scan width corresponding to the desired expanded or enlarged mode of operation described above. Thereafter, once potentiometers 142 and 136 have been adjusted, the horizontal size of the displayed image within the system may be selected by simply moving switch 130 back and forth between contacts 131 and 132.

It will be apparent to those skilled in the art that the system shown in FIG. 2 provides substantial advantages in producing the overscan or expanded mode of operation. Most significantly, the stabilizing operation described above which utilizes the above-described diode modulator and feedback control loop remains intact and in full operation regardless of the setting of switch 130. Thus, both modes of operation are benefited by the stable maintenance of selected scan width. In addition, it will be apparent to those skilled in the art that the present invention system provides independent control of the scan width in each mode of operation. Thus, the interactive character which would otherwise make adjustment of scan width controls is avoided.

In addition to the two mode operation described above, the DC control of horizontal scan width provided by the present invention system facilitates additional control of horizontal scan width in the event such control is desired. For example, in the above-referenced incorporated patent application, the inventive system set forth therein utilizes a feedback loop responsive to CRT beam current which is operative upon horizontal scan width. The system set forth in FIG. 2 provides an advantageous DC operative horizontal scan width control mechanism. Toward this end, diode 137 is coupled between potentiometer 135 and a connection terminal 144. It will be apparent to those skilled in the art that the application of a DC control voltage to terminal 144 would permit further control of the conduction of transistor 120 and would thereby supplement the above-described scan width control.

What has been shown is a horizontal scan modulator having size selection in which independent control of scan width in both normal and overscan modes of operation is attained. The size control apparatus in each mode of operation may be independently adjusted without interactive effect. In addition, the system provides for stable scan width at the desired settings through the closed loop control of the diode modulator.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a display system having a cathode ray tube in which an intensity modulated electron beam is directed toward a display screen, vertical deflection means, and horizontal deflection means including a horizontal deflection yoke for producing horizontal deflection currents within the horizontal deflection yoke, horizontal scan control means comprising:
   a horizontal scan amplitude modulator coupled to the horizontal deflection yoke including a variable modulator impedance element controlling the amplitude of horizontal deflection scan current within the horizontal deflection yoke;
   a modulator drive control coupled to the horizontal deflection means and said scan amplitude modulator and producing a scan modulator drive signal for controlling said variable modulator impedance;
   mode control means for operating said horizontal scan amplitude modulator in either a first or second distinct mode, said mode control means being coupled to said modulator drive control and being operable in said first mode for causing said modulator drive control to establish a first predetermined amplitude of horizontal deflection yoke current within the horizontal deflection yoke and operable in said second mode for causing said modulator drive control to establish a second predetermined amplitude of horizontal deflection yoke current within the horizontal deflection yoke; and
   switch means coupled to said mode control means for selecting either said first or second mode.

2. Horizontal scan control means as set forth in claim 1 wherein said horizontal scan modulator includes a diode modulator.

3. Horizontal scan control means as set forth in claim 2 wherein said variable modulator impedance element includes a modulation inductance and an amplifier.

4. Horizontal scan control means as set forth in claim 3 wherein said amplifier includes a field effect transistor coupled in series with said modulation inductance.

5. Horizontal scan control means as set forth in claim 4 wherein said modulator drive control includes feedback means applying a signal representative of the horizontal deflection currents to said field effect transistor to form a negative feedback loop.

6. Horizontal scan control means as set forth in claim 5 wherein said feedback means includes a feedback amplifier having a variable gain and a gain control input terminal.

7. Horizontal scan control means as set forth in claim 6 wherein said feedback amplifier includes a DC gain control and wherein said switch means include a plurality of DC voltage sources and switch selectively coupling either of said DC voltage sources to said gain control terminal of said feedback amplifier.

8. Horizontal scan control means as set forth in claim 6 wherein said plurality of DC voltage sources include a pair of adjustable potentiometers, a source of DC voltage and a switch for selectively applying selected DC voltages to said gain control terminal of said feedback amplifier.

9. A size selective horizontal scan control for use in a cathode ray tube display having a horizontal deflection system driving a horizontal deflection yoke, said horizontal scan control comprising:

a diode modulator coupled to the horizontal deflection yoke;
   a modulating inductance coupled to said diode modulator;
   a transistor having common and output electrodes coupled in a series with said modulating inductance and an input electrode;
   a DC gain controlled amplifier having a signal input coupled to said modulating inductance, a signal output coupled to said input electrode of said transistor, and a DC gain control input;
   a first adjustable DC voltage source;
   a second adjustable DC voltage source; and
   a switch for selectively coupling said first and second DC voltage sources to said DC gain control input of said DC gain controlled amplifier.

10. A horizontal scan control as set forth in claim 9 wherein said transistor is a field effect transistor.

* * * * *